(12) United States Patent
Chen et al.

(10) Patent No.: US 11,252,386 B1
(45) Date of Patent: Feb. 15, 2022

(54) STRUCTURED-LIGHT SCANNING SYSTEM AND METHOD

(71) Applicant: Himax Technologies Limited, Tainan (TW)

(72) Inventors: Wu-Feng Chen, Tainan (TW); Hsueh-Tsung Lu, Tainan (TW); Cheng-Che Tsai, Tainan (TW); Ching-Wen Wang, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 17/079,310

(22) Filed: Oct. 23, 2020

(51) Int. Cl.
*H04N 9/31* (2006.01)
*G01B 11/25* (2006.01)

(52) U.S. Cl.
CPC .......... *H04N 9/3164* (2013.01); *G01B 11/25* (2013.01); *G01B 11/254* (2013.01);
(Continued)

(58) Field of Classification Search
CPC .. H04N 13/363; H04N 13/239; H04N 13/341; H04N 13/361; H04N 13/366; H04N 13/344; H04N 5/74; H04N 13/383; H04N 13/117; H04N 13/286; H04N 2013/0085; H04N 5/21; H04N 5/225; H04N 13/337; H04N 13/334; H04N 9/3105; H04N 9/317; H04N 5/7441; H04N 9/3152; H04N 9/3167; H04N 13/302; H04N 13/398; H04N 13/359; H04N 13/207; H04N 13/324; H04N 9/3147; H04N 13/00; H04N 13/279; H04N 9/3194; H04N 13/189; H04N 13/305; H04N 13/194; H04N 13/211; H04N 13/32; H04N 13/388; H04N 13/139; H04N 13/31; H04N 13/349; H04N 13/161; H04N 13/204; H04N 13/254; H04N 13/332; H04N 13/365; H04N 19/597; H04N 13/395; H04N 7/142; H04N 7/147; H04N 13/312; H04N 13/368; H04N 5/2354; H04N 5/335; H04N 9/0451; H04N 13/15; H04N 13/156; H04N 13/218;
(Continued)

(56) References Cited

U.S. PATENT DOCUMENTS 6,542,249 B1 *  4/2003  Kofman ............. G01B 11/2513
                                                        356/601
8,760,499 B2 *  6/2014  Russell ................... G03B 35/00
                                                        348/46

(Continued)

FOREIGN PATENT DOCUMENTS

WO   WO-2009037662 A2 *  3/2009  ............. G03B 15/02
WO   WO-2019160032 A1 *  8/2019  ........... G01B 11/245

*Primary Examiner* — Michael P Stafira
(74) *Attorney, Agent, or Firm* — Donald E. Stout; Stout, Uxa & Buyan, LLP

(57) ABSTRACT

A structured-light scanning system includes a plurality of switchable projectors that respectively generate emitted lights with a predetermined pattern, each switchable projector being capable of switchably generating either a two-dimensional (2D) emitted light or a three-dimensional (3D) emitted light; an optical alignment device that aligns the emitted lights to generate an aligned light, which is projected onto and reflected from a surface of an object, resulting in a reflected light; and an image sensor that detects the reflected light.

12 Claims, 3 Drawing Sheets

(52) U.S. Cl.
CPC ......... *G01B 11/2518* (2013.01); *H04N 9/312* (2013.01); *H04N 9/3152* (2013.01)

(58) Field of Classification Search
CPC .. H04N 13/243; H04N 13/271; H04N 9/3108; H04N 9/3164; H04N 13/346; H04N 13/39; H04N 2013/0081; H04N 21/414; H04N 7/185; H04N 13/257; H04N 13/296; H04N 13/351; H04N 13/371; H04N 5/247; H04N 9/3114; H04N 9/3141; H04N 1/409; H04N 1/6097; H04N 13/133; H04N 13/229; H04N 13/393; H04N 19/00; H04N 2213/001; H04N 5/7458; H04N 9/3129; H04N 9/315; H04N 9/3197; H04N 13/10; H04N 13/128; H04N 13/158; H04N 13/167; H04N 13/315; H04N 13/356; H04N 2005/7466; H04N 2013/403; H04N 5/3532; H04N 9/12; H04N 9/31; H04N 9/3111; H04N 9/312; H04N 9/3155; H04N 9/3161; H04N 9/3179; H04N 9/3188; H04N 13/111; H04N 13/122; H04N 13/20; H04N 13/289; H04N 13/30; H04N 13/322; H04N 13/339; H04N 13/354; H04N 13/373; H04N 13/376; H04N 13/378; H04N 13/38; H04N 2013/0088; H04N 2013/405; H04N 21/235; H04N 21/4122; H04N 21/435; H04N 21/816; H04N 3/10; H04N 5/00; H04N 5/217; H04N 5/2254; H04N 5/2256; H04N 5/23206; H04N 5/232945; H04N 5/44; H04N 5/645; H04N 5/70; H04N 5/7491; H04N 9/045; H04N 9/14; H04N 9/3185; G02B 27/0172; G02B 2027/0178; G02B 27/017; G02B 27/0093; G02B 2027/014; G02B 27/01; G02B 27/0176; G02B 5/005; G02B 2027/0134; G02B 6/34; G02B 6/00; G02B 2027/0118; G02B 30/24; G02B 6/06; G02B 2027/0123; G02B 2027/0125; G02B 26/0808; G02B 6/32; G02B 17/08; G02B 2006/0098; G02B 2027/0163; G02B 27/0087; G02B 27/4205; G02B 3/0006; G02B 3/0037; G02B 5/1814; G02B 5/1828; G02B 5/20; G02B 6/02042; G02B 6/40; G02B 2027/0187; G02B 2027/0138; G02B 27/144; G02B 27/283; G02B 26/02; G02B 27/1006; G02B 27/1046; G02B 27/1053; G02B 27/1073; G02B 27/142; G02B 27/143; G02B 27/145; G02B 27/149; G02B 30/27; G02B 30/25; G02B 30/26; G02B 30/50; G02B 6/0011; G02B 30/56; G02B 6/2706; G02B 27/0101; G02B 30/52; G02B 2207/129; G02B 27/10; G02B 2027/0132; G02B 30/33; G02B 6/0038; G02B 6/0048; G02B 6/0055; G02B 6/0068; G02B 13/16; G02B 2027/0141; G02B 3/08; G02B 30/36; G02B 5/0205; G02B 5/30; G02B 6/001; G02B 6/0033; G02B 6/004; G02B 6/0045; G02B 6/0046; G02B 6/005; G02B 6/0051; G02B 6/0073; G02B 6/353; G02B 2027/0156; G02B 26/005; G02B 26/0833; G02B 27/0075; G02B 3/0056; G02B 30/31; G02B 30/34; G02B 5/045; G02B 5/285; G02B 1/005; G02B 13/0085; G02B 2027/0136; G02B 2027/0143; G02B 2027/0196; G02B 21/0032; G02B 26/001; G02B 27/0972; G02B 27/14; G02B 27/30; G02B 3/14; G02B 30/23; G02B 5/201; G02B 5/223; G02B 5/28; G02B 5/289; G02B 2006/12069; G02B 2006/12083; G02B 2006/12107; G02B 2027/0127; G02B 2027/0158; G02B 2027/0159; G02B 21/004; G02B 21/0064; G02B 21/008; G02B 21/14; G02B 26/008; G02B 26/06; G02B 26/0816; G02B 26/10; G02B 27/0081; G02B 27/0149; G02B 27/0994; G02B 5/32; G02B 6/0096; G02B 6/122; G02B 6/136; G02B 1/10; G02B 13/007; G02B 13/0075; G02B 13/009; G02B 13/22; G02B 2027/0154; G02B 2027/0174; G02B 2027/0198; G02B 21/0048; G02B 21/0076; G02B 21/367; G02B 26/0825; G02B 26/085; G02B 26/106; G02B 27/0927; G02B 27/0961; G02B 27/0966; G02B 27/285; G02B 27/425; G02B 27/64; G02B 3/00; G02B 3/0012; G02B 3/0043; G02B 3/0068; G02B 30/00; G02B 30/30; G02B 30/40; G02B 5/06; G02B 6/002; G02B 6/0028; G02B 6/0036; G02B 6/10; G02B 6/26; G02B 7/102; G01B 11/2513; G01B 11/25; G01B 11/24; G01B 11/00; G01B 11/2518; G01B 11/002; G01B 11/14; G01B 11/026; G01B 11/2545; G01B 11/245; G01B 11/22; G01B 11/02; G01B 11/2527; G01B 11/254; G01B 11/303; G01B 11/022; G01B 11/2755; G01B 11/30; G01B 11/03; G01B 11/2504; G01B 11/272; G01B 9/02091; G01B 11/2536; G01B 11/26; G01B 11/2522; G01B 21/042; G01B 21/22; G01B 11/005; G01B 2210/52; G01B 11/2509; G01B 21/02; G01B 11/2531; G01B 9/02044; G01B 9/02069; G01B 11/04; G01B 9/02

See application file for complete search history.

(56) References Cited

U.S. PATENT DOCUMENTS

| | | | |
|---|---|---|---|
| 10,036,630 B1* | 7/2018 | Sze | .......................... G06T 7/521 |
| 2013/0215235 A1* | 8/2013 | Russell | ................ H04N 13/243 |
| | | | 348/47 |
| 2016/0358382 A1* | 12/2016 | Lee | .......................... H04N 9/31 |
| 2019/0272411 A1* | 9/2019 | Zou | .................... G06K 9/00214 |

* cited by examiner

STRUCTURED-LIGHT SCANNING SYSTEM AND METHOD

BACKGROUND OF THE INVENTION

1. Field of the Invention

The present invention generally relates to a structured-light scanning system and method, and more particularly to a structured-light scanning system and method with an optical alignment device.

2. Description of Related Art

Structured-light scanning is the process of projecting a pattern of light onto a scene. The deformation of the pattern is captured by a camera, and then processed, for example, by triangulation, to reconstruct a three-dimensional or depth map of the objects in the scene. The structured-light scanning may, for example, be adapted to object detection for detecting objects of a certain class in digital images and videos. Specifically, the structured-light scanning may be adapted to face detection, which is a specific case of object detection, in mobile devices such as cellphones for detecting frontal human faces.

However, when the structured-light scanning is performed in the outdoors or in a long-range operation, interference caused by ambient light may greatly degrade image quality, for example, in term of signal-to-noise ratio.

A need has thus arisen to propose a novel scheme to prevent the ambient light from affecting the structured-light scanning, particularly when carried out in the outdoors or in a long-range operation.

SUMMARY OF THE INVENTION

In view of the foregoing, it is an object of the embodiment of the present invention to provide a structured-light scanning system and method capable of being immune to interference from ambient light particularly when the structured-light scanning system is disposed or performed outdoors or in a long-range operation.

According to one embodiment, a structured-light scanning system includes a plurality of switchable projectors, an optical alignment device and an image sensor. The switchable projectors respectively generate emitted lights with a predetermined pattern, each switchable projector being capable of switchably generating either a two-dimensional (2D) emitted light or a three-dimensional (3D) emitted light. The optical alignment device aligns the emitted lights to generate an aligned light, which is projected onto and reflected from a surface of an object, resulting in a reflected light. The image sensor detects the reflected light.

DETAILED DESCRIPTION OF THE INVENTION

Figure 1A:
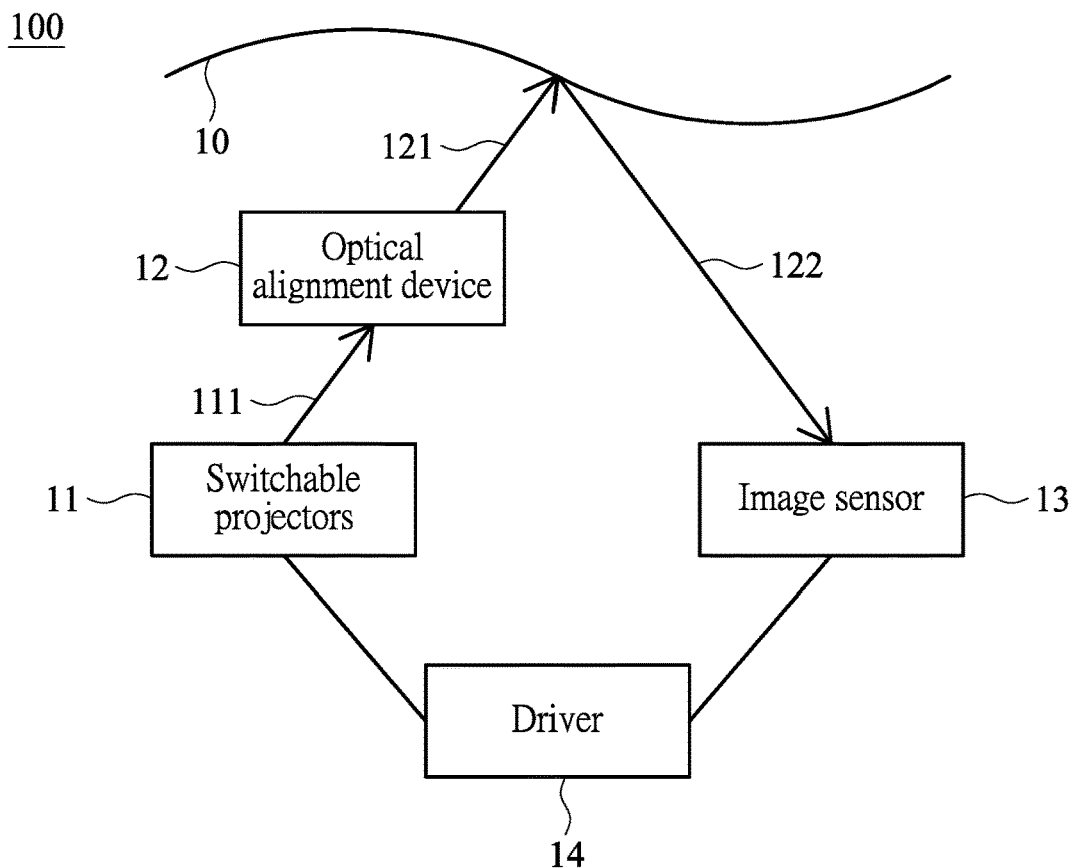
FIG. 1A shows a block diagram illustrating a structured-light scanning system according to one embodiment of the present invention.

FIG. 1A shows a block diagram illustrating a structured-light scanning system 100 according to one embodiment of the present invention.

In the embodiment, the structured-light scanning system 100 may include a plurality of switchable projectors 11 configured to respectively generate emitted lights 111 with a predetermined pattern. Each switchable projector 11 is capable of switchably generating either a two-dimensional (2D) emitted light or a three-dimensional (3D) emitted light.

Figure 1B:
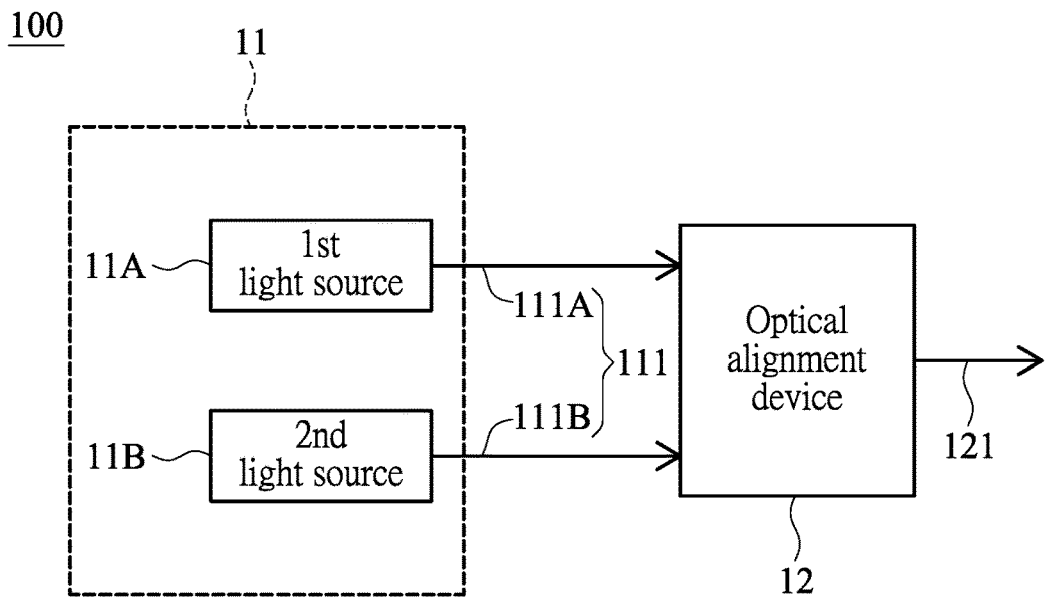
FIG. 1B shows a detailed block diagram illustrating a portion of the structured-light scanning system of FIG. 1A.

FIG. 1B shows a detailed block diagram illustrating a portion of the structured-light scanning system 100 of FIG. 1A. Specifically, the switchable projectors 11 may include a first light source 11A configured to generate a first emitted light 111A, and a second light source 11B configured to generate a second emitted light 111B.

According to one aspect of the embodiment, the structured-light scanning system 100 may include an optical alignment device 12 configured to align the first emitted light 111A (from the first light source 11A) and the second emitted light 111B (from the second light source 11B), thereby generating an aligned light 121.

Figure 2:
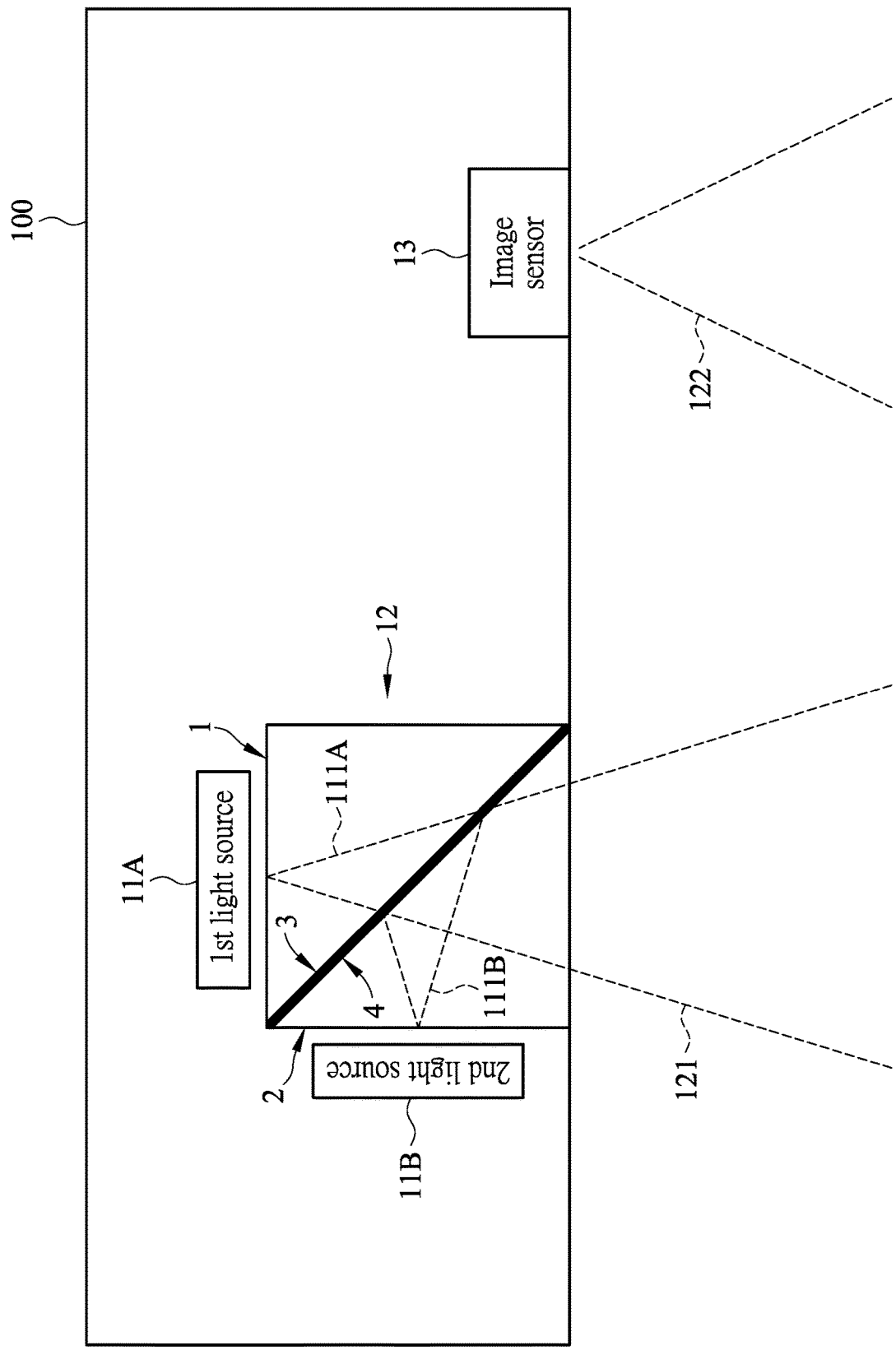
FIG. 2 shows a cross-sectional view of the structured-light scanning system according to one embodiment of the present invention.

FIG. 2 shows a cross-sectional view of the structured-light scanning system 100 according to one embodiment of the present invention. Specifically, the first light source 11A is disposed contiguous with a first side 1 of the optical alignment device 12, and the second light source 11B is disposed contiguous with a second side 2 of the optical alignment deice 12. The second side 2 is adjacent to the first side 1.

According to another aspect of the embodiment, the optical alignment device 12 may be composed of two triangular prisms which are joined (e.g., by glue) at an interface with a first surface 3 facing the first light source 11A and a second surface 4 facing the second light source 11B. Specifically, the first emitted light 111A incident on the first surface 3 may pass through the interface, and the second emitted light 111B incident on the second surface 4 may be reflected from the interface. Accordingly, the first emitted light 111A passing through the interface and the second emitted light 111B reflected from the interface are thus aligned and combinably outputted as the aligned light 121.

Referring back to FIG. 1A, the aligned light 121 is then projected onto and reflected from a surface of an object 10, resulting in a reflected light 122. The structured-light scanning system 100 of the embodiment may include an image sensor 13, such as a camera, configured to detect the reflected light 122. The information detected by the image sensor 13 may, for example, be utilized to measure a three-dimensional shape of the object 10, such as a human face in facial recognition.

The structured-light scanning system 100 of the embodiment may include a driver 14 configured to drive the switchable projectors 11 to timely generate the aligned light 121, and to control the image sensor 13 such that the image sensor 13 can work in coordination with the switchable projectors 11.

Figure 3:
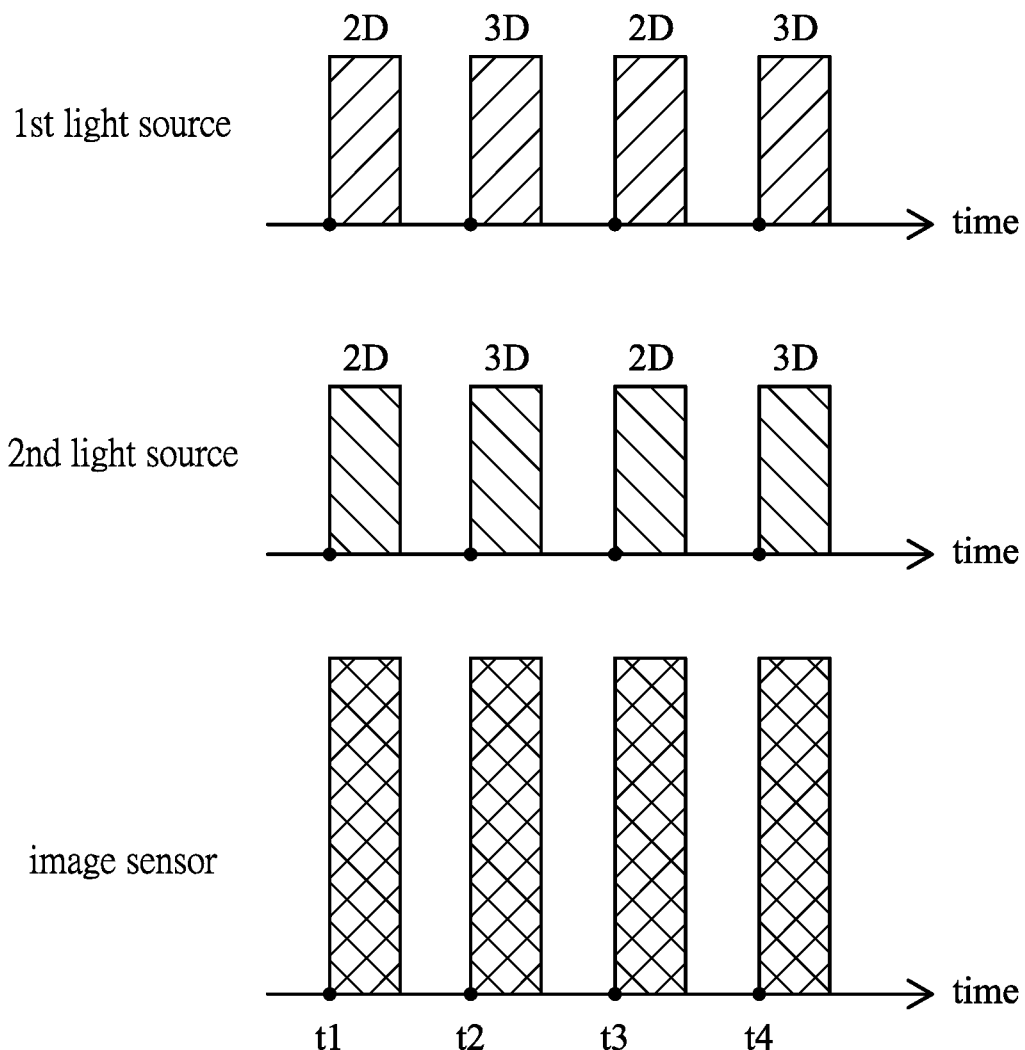
FIG. 3 shows an exemplary timing diagram of the first light source, the second light source and the image sensor driven and controlled by the driver.

FIG. 3 shows an exemplary timing diagram of the first light source 11A, the second light source 11B and the image sensor 13 driven and controlled by the driver 14. Specifically, at time t1, 2D emitted lights are generated by the first light source 11A and the second light source 11B, resulting in an enhanced (2D) aligned light 121, which is then detected by the image sensor 13. Next, at time t2, 3D emitted lights are generated by the first light source 11A and the second light source 11B, resulting in an enhanced (3D) aligned light 121, which is then detected by the image sensor 13. Likewise, an enhanced (2D) aligned light 121 composed of 2D emitted lights is generated at time t3, followed by generating an enhanced (3D) aligned light 121 composed of 3D emitted lights at time t4. Generally speaking, the 2D aligned light 121 and the 3D aligned light 121 may be outputted by the optical alignment device 12 and is detected by the image sensor 13 in a time-division manner.

According to the embodiment as described above, as the first light source 11A and the second light source 11B are embedded at the same place, a distance (or baseline) between the image sensor 13 and the switchable projectors 11 may be maintained constant. Moreover, as exemplified in FIG. 3, the aligned light 121 may be substantially enhanced (e.g., doubled in this case) to increase the signal-to-noise ratio. Therefore, when performed in the outdoors or in a long-range operation, the structured-light scanning system 100 is capable of being relatively immune to interference from ambient light, and the three-dimensional shape of the object 10 can be measured with confidence based on the information as detected by the image sensor 13.

Although specific embodiments have been illustrated and described, it will be appreciated by those skilled in the art that various modifications may be made without departing from the scope of the present invention, which is intended to be limited solely by the appended claims.

What is claimed is:

1. A structured-light scanning system, comprising:
   a plurality of switchable projectors that respectively generate emitted lights with a predetermined pattern, each switchable projector being capable of switchably generating either a two-dimensional (2D) emitted light or a three-dimensional (3D) emitted light;
   an optical alignment device that aligns the emitted lights to generate an aligned light, which is projected onto and reflected from a surface of an object, resulting in a reflected light;
   an image sensor that detects the reflected light; and
   a driver that drives the plurality of switchable projectors to timely generate the aligned light, and controls the image sensor to work in coordination with the plurality of switchable projectors.

2. The system of claim 1, wherein the plurality of switchable projectors comprise:
   a first light source that generates a first emitted light; and
   a second light source that generates a second emitted light.

3. The system of claim 2, wherein the optical alignment device is composed of two triangular prisms which are joined at an interface.

4. The system of claim 3, wherein the first light source is disposed contiguous with a first side of the optical alignment device, and the second light source is disposed contiguous with a second side of the optical alignment deice, the second side being adjacent to the first side.

5. The system of claim 4, wherein the interface has a first surface facing the first light source and a second surface facing the second light source, wherein the first emitted light incident on the first surface passes through the interface, and the second emitted light incident on the second surface is reflected from the interface, thereby generating the aligned light.

6. The system of claim 1, wherein the driver drives the plurality of switchable projectors to generate the 2D emitted light and to generate the 3D emitted light alternatively in a time-division manner.

7. A structured-light scanning method, comprising:
   generating a plurality of emitted lights with a predetermined pattern, each emitted light being either a two-dimensional (2D) emitted light or a three-dimensional (3D) emitted light;
   aligning the emitted lights to generate an aligned light, which is projected onto and reflected from a surface of an object, resulting in a reflected light;
   detecting the reflected light; and
   coordinating generation of the emitted lights to timely generate the aligned light, and controlling detection of the reflected light to work in coordination with the generation of the emitted lights.

8. The method of claim 7, wherein the plurality of emitted lights comprise a first emitted light generated by a first light source and a second emitted light generated by a second light source.

9. The method of claim 8, wherein the aligned light is generated by an optical alignment device composed of two triangular prisms which are joined at an interface.

10. The method of claim 9, wherein the first light source is disposed contiguous with a first side of the optical alignment device, and the second light source is disposed contiguous with a second side of the optical alignment deice, the second side being adjacent to the first side.

11. The method of claim 10, wherein the interface has a first surface facing the first light source and a second surface facing the second light source, wherein the first emitted light incident on the first surface passes through the interface, and the second emitted light incident on the second surface is reflected from the interface, thereby generating the aligned light.

12. The method of claim 7, wherein the 2D emitted light and the 3D emitted light are generated alternatively in a time-division manner.

* * * * *